Sept. 7, 1948.  M. A. BIOT ET AL  2,448,698
FLUTTER PREDICTING APPARATUS
Filed Oct. 21, 1944  2 Sheets-Sheet 1
FIG. 1
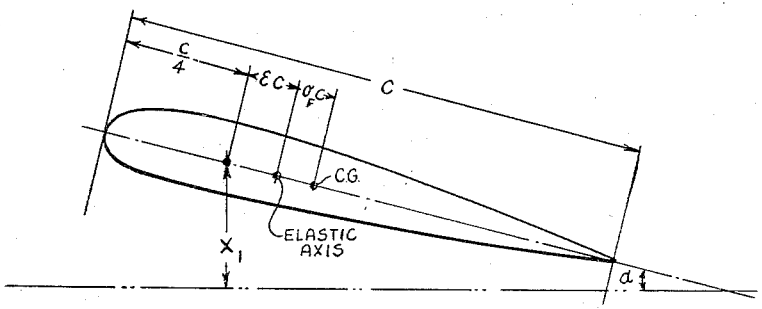
FIG. 2
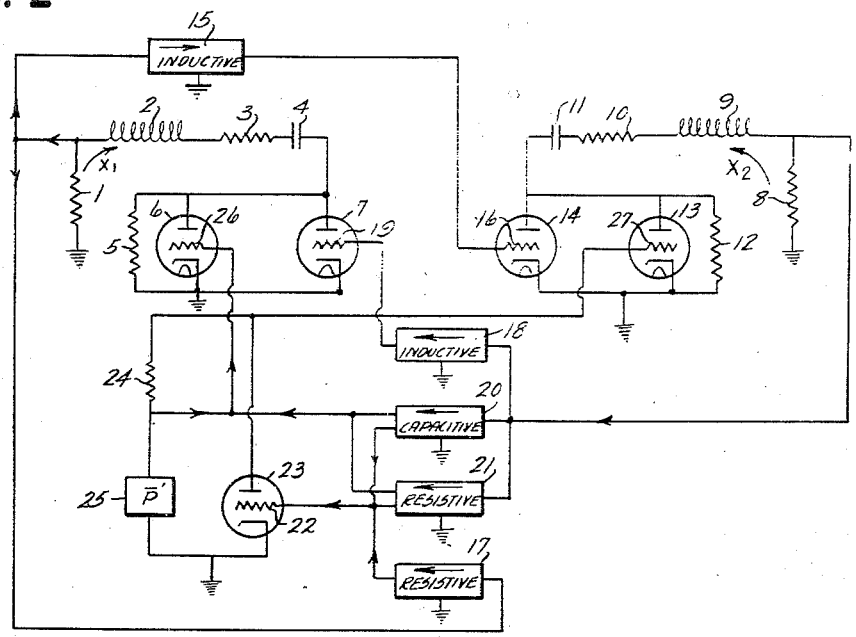
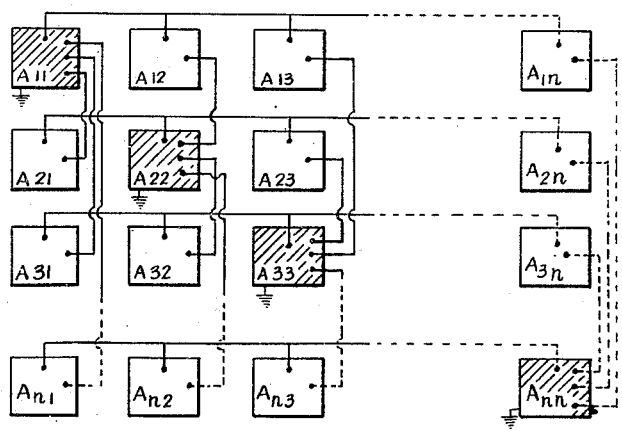
FIG. 4
INVENTORS
MAURICE A. BIOT
THOMAS H. WIANCKO
BY Joseph Ch. Hazell
and Abade toouty
ATTORNEYS

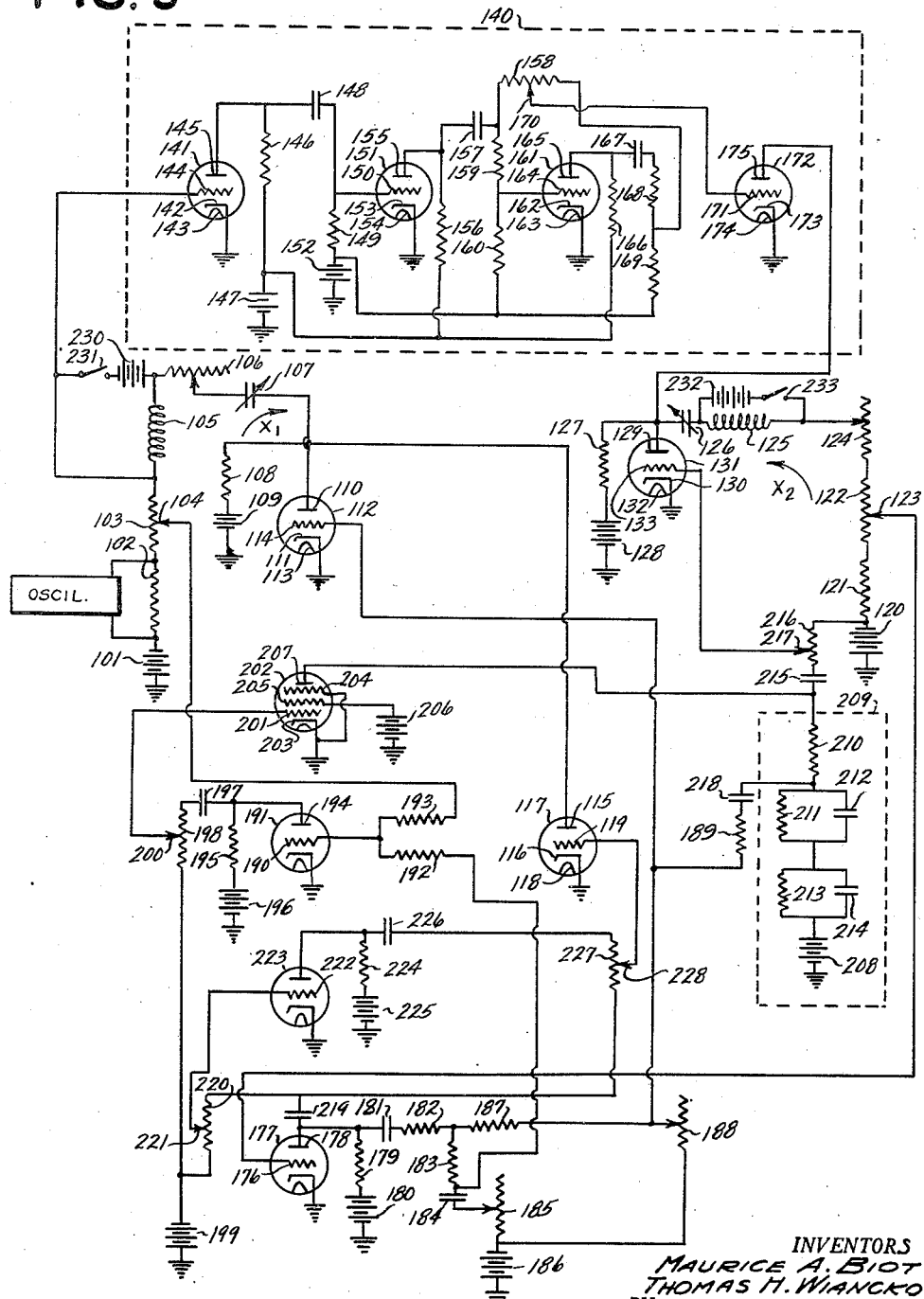

Patented Sept. 7, 1948

2,448,698

UNITED STATES PATENT OFFICE 2,448,698

FLUTTER PREDICTING APPARATUS

Maurice A. Biot, Pasadena, and Thomas H. Wiancko, Altadena, Calif.

Application October 21, 1944, Serial No. 559,822

7 Claims. (Cl. 235—61)

This invention relates to electrical analogies for mechanical systems and more particularly to electric networks whose behavior is equivalent to that of a mechanical system moving with respect to a surrounding fluid, the principal object being to predict the behavior of the mechanical system by observing that of the electric network.

Two physical systems A and B may be physically very different though governed by the same mathematical laws. It may happen that experimental and mathematical investigation of the behavior of system A is very difficult or impossible, but that system B lends itself readily to experimental investigation. In this case the behavior of system A may be predicted by means of observations made upon system B. System B may then be called an equivalent system or an analogy for system A, and may serve as a calculating machine for the solution of the equations governing the physical behavior of system A.

Under certain conditions, spontaneous deformative oscillations may arise in a mechanical system which moves with respect to a surrounding fluid. To such a class belongs the phenomenon usually designated as "flutter" which frequently occurs in aircraft wings and tail surfaces. The phenomenon of flutter may be defined as an aero-mechanical instability due to the interaction between aerodynamic and mechanical forces and moments such that any disturbance of the airfoil at a given air-speed will cause mechanical vibrations of the airfoil whose amplitudes will increase with time. The mechanical frequency of these oscillations is known as the flutter frequency. It is very costly and difficult to study this phenomenon by direct observation and experiment, while on the other hand the mathematical equations which govern this phenomenon are difficult to use practically for the rapid prediction of the occurrence of flutter under various conditions. A system exhibiting this phenomenon of flutter is an example of system A. In this invention an equivalent electric network is made to play the role of system B. In the mathematical analysis of the problem of flutter it is convenient to use the so-called "reduced" frequency of the oscillations which is equal to the product of the flutter frequency and the average semi-chord divided by the airspeed.

It is therefore an object of this invention to provide an equivalent electric network, as defined above, which shall serve as a calculating machine for the rapid prediction of flutter phenomenon.

The analogy is not straightforward, however, because in most cases the exact mathematical equations which govern the phenomenon of flutter contain complex coefficients which are transcendental functions of the flutter frequency and cannot be represented exactly in the electric network by a combination of a finite number of electrical elements.

A further object is therefore to provide, in an equivalent electric network, finite impedance networks which are approximately equivalent, mathematically, to certain transcendental functions which appear in the coefficients of the mathematical equations of motion of certain fluid-mechanical systems.

Furthermore the particular form in which the equations are usually derived is not the most convenient for the establishment of a workable electric model because of the practical desirability of keeping fixed certain electrical elements such as inductance coils. Also the magnitude of the various electrical elements and the frequency of the electrical oscillations must be kept between practical limits. Since the velocity parameter generally appears as an unknown it is desirable that it appear in as few parameters as possible.

Hence a further object of this invention is to provide an equivalent electric network which shall make possible the rapid prediction of the critical flutter velocity of a given fluid-mechanical system, and whose circuit elements shall be capable of adjustment in a simple way to correspond to the fluid velocity of the mechanical system.

A further object of this invention is to provide the means for the prediction of the rate of transfer of energy, as a function of velocity, from the fluid to the mechanical parts, or vice-versa, in a fluid-mechanical system capable of spontaneous oscillations or deformation.

A still further object is to provide the means, in an equivalent electric network, for the determination of the response of a given fluid-mechanical system to a given perturbation.

Further objects and advantages of this invention will become apparent as the following description proceeds, taken in conjunction with the accompanying drawings, in which:

Fig. 1 is a diagrammatic view of an airfoil section upon which has been indicated the physical significance of the various symbols used in connection with the following description.

Fig. 2 is a block diagram illustrating one arrangement of the invention to suit a particular problem.

Fig. 3 is a schematic wiring diagram illustrating in detail a possible electric network corresponding to Fig. 2.

Fig. 4 is a block diagram showing how the principles of the device disclosed herein may be extended to any desired number of degrees of freedom.

Before describing these drawings, the equations of motion of a particular fluid-mechanical system are set forth, so that the significance of the various parts of the invention may be more readily pointed out.

For an example of the application of the invention to flutter problems, we will take the case of flexure-torsion binary wing flutter. The equations for this type of flutter may be stated in the following form:

(1) $\left[\frac{A_1 k_1 a_{11}}{\omega_0}p + \frac{2A_1 k_1}{\mu} + \frac{A_1 k_1 \omega_0 \lambda^2}{p}\right]X_1 - \left[\frac{A_1 k_2 a_{12}}{\omega_0}p + \frac{A_1 k_2}{\mu}(2-2\epsilon) + \frac{2A_1 k_2 \omega_0}{\mu p}\right]X_2 - \frac{4A_1 \overline{P}^1}{\mu}y = 0$ (2) $-\frac{A_2 k_1 a_{12}}{\omega_0}pX_1 + \left[\frac{A_2 k_2 a_{22}}{\omega_0}p + \frac{A_2 k_2}{\mu}(\tfrac{1}{2}-\epsilon) + \frac{A_2 k_2 \omega_0 \eta^2 \lambda^2}{P}\right]X_2 - \frac{4A_2 \epsilon}{\mu}\overline{P}y = 0$ The symbols have the following significance:

$X_1$ = vertical displacement of the elastic axis of the wing.
$X_2$ = angular displacement of the chord line times the chord length.
$c$ = chord length, feet.
$\epsilon$ = distance of elastic axis back of ¼ chord point in fraction of chord.
$\mu$ = ratio of mass of wing to mass of enclosing air cylinder.
$\sigma_F$ = distance of C. G. position back of elastic axis, in fraction of chord.
$i_F$ = radius of gyration of wing mass about C. G. position, in fraction of chord.
$\omega_\alpha$ = natural frequency in vacuum of angular oscillation of the wing about the elastic axis, in radians per second.
$\omega_h$ = natural frequency in vacuum of vertical displacement of the wing in radians per second.
$v$ = true airspeed, feet per second.

$a_{11} = 1 + \frac{1}{\mu}$ $a_{12} = \sigma_F + \frac{1}{\mu}(\tfrac{1}{4}-\epsilon)$ $a_{22} = \sigma_F^2 + i_F^2 + \frac{1}{32\mu} + \frac{1}{\mu}\left(\frac{1}{4}-\epsilon\right)$ $\lambda = \frac{\omega_h c}{v}$ $\eta = \frac{\omega_\alpha}{\omega_h}\sqrt{\sigma_F^2 + i_F^2}$ $A_1$, $A_2$, $k_1$, $k_2$, and $\omega_0$ are arbitrary parameters.

$p$ = differential time operator = $\frac{d}{dt}$ $\overline{P}$ = complex lift factor.

$\overline{P} = \frac{H_1^{(2)}\left(\frac{\omega c}{2v}\right)}{H_0^{(2)}\left(\frac{\omega c}{2v}\right) + H_1^{(2)}\left(\frac{\omega c}{2v}\right)}$ for infinite aspect ratio wings.

$H_0^{(2)}(X) = J_0(X) - iY_0(X)$
$H_1^{(2)}(X) = J_1(X) - iY_1(X)$
$\overline{P}^1 = \overline{P} - \tfrac{1}{2}$ $y = \frac{k_2 \omega_0 X_2}{p} - k_1 X_1 + k_2 X_2(\tfrac{1}{2}-\epsilon)$ The Bessel functions $J_0$, $Y_0$, $J_1$, and $Y_1$ are given in tables in McLachlan's "Bessel Functions for Engineers."

Figure 2 is a simplified block diagram of an electric network which may be made so that the electric currents $X_1$ and $X_2$ satisfy the above equations. In the diagram, filament and anode supply voltages and grid coupling condensers have been omitted. The $X_1$ circuit consists of a series combination of a resistor 1, self-inductor 2, resistor 3, capacitor 4, and the parallel combination of a load resistor 5 and the anode-cathode circuits of vacuum tubes 6 and 7.

The $X_2$ circuit consists of a series combination of a resistor 8, a self-inductor 9, a resistor 10, a capacitor 11, and the parallel combination of a load resistor 12 and the anode-cathode circuits of vacuum tubes 13 and 14.

The resistor 1 serves also as the input impedance of an inductive transfer impedance network 15, whose output potential is impressed on the control grid 16 of the vacuum tube 14, and as the input impedance of a resistive transfer impedance network 17. The resistor 8 serves also as the input impedance of an inductive transfer impedance network 18, whose output potential is impressed on the control grid 19 of the vacuum tube 7, and as the input impedance of the capacitive and resistive transfer impedance networks 20 and 21, parts of whose output potentials are added together with the output potential of the transfer impedance 17 and impressed on the control grid 22 of a vacuum tube 23 whose anode-cathode resistance is high compared with the impedance of its load, consisting of a resistor 24 and an impedance 25 whose values are proportional, respectively, to ½ and the complex quantity $\overline{P}^1$. The potential drop across the impedance proportional to $\overline{P}^1$ is added to parts of the output potentials of the transfer impedances 20 and 21 and impressed on the control grid 26 of the vacuum tube 6. The potential drop across the total impedance proportional to $\overline{P}$ is impressed on the control grid 27 of the vacuum tube 13.

Suppose now that the properties of the network are assigned the following symbols: the total resistance in the $X_1$ circuit, made up of the resistors 1, 3, 5, and the anode-cathode resistance of the vacuum tubes 6 and 7, is equal to $R_{11}$, the self-inductance 2 equal to $L_{11}$, and the capacity 4 equal to $C_{11}$. The total resistance in the $X_2$ circuit, made up of 8, 10, 12 and the anode-cathode resistance of the tubes 13 and 14, is $R_{22}$, the self-inductance 9 is $L_{22}$, and the capacity 11 is $C_{22}$. Let the potential across the resistor 12 in the $X_2$ circuit due to the tube 14, the inductive transfer impedance network 15, and the current $X_1$ be $L_{21}pX_1$. Let the potential across the resistor 5 in the $X_1$ circuit due to the tube 7, the inductive transfer impedance 18, and the current $X_2$ be $L_{12}pX_2$. Let the potential across the resistor 5 due to the tube 6, the capacitive transfer impedance 20, and the current $X_2$ be $$\frac{X_2}{C_{12}p}$$

and that due to the resistive transfer impedance 21 be $R_{12}X_2$.

Let the potential across the resistor 5 in the $X_1$ circuit due to the tube 6, the $\overline{P}^1$ impedance 25, the tube 23, the capacitive and resistive transfer impedances 20 and 21, and the resistive transfer impedance 17 be $$M\overline{P}^1\left\{\left(\frac{1}{C_{0_2}p}+R_{0_2}\right)X_2 + R_{0_1}X_1\right\}$$

and let the potential across the resistor 12 due to the tube 13, the impedances 24 and 25, the tube 23, and the transfer impedances 20, 21, and 17 be $$N\overline{P}\left\{\left(\frac{1}{C_{0_2}p}+R_{0_2}\right)X_2 + R_{0_1}X_1\right\}$$

The equations governing the behavior of this electric network, assuming no external stimulus, may be obtained by equating separately the total potential drop in the $X_1$ circuit and the total potential drop in the $X_2$ circuit to zero. Thus the following equations are obtained:

$$(3) \quad \left[L_{11}p+R_{11}+\frac{1}{C_{11}p}\right]X_1+\left[L_{12}p+R_{12}+\frac{1}{C_{12}p}\right]X_2+M\bar{P}^1\left\{\left(\frac{1}{C_{0_2}p}+R_{0_2}\right)X_2+R_{0_1}X_1\right\}=0$$

$$(4) \quad L_{21}pX_1+\left[L_{22}p+R_{22}+\frac{1}{C_{22}p}\right]X_2+N\bar{P}\left\{\left(\frac{1}{C_{0_2}p}+R_{0_2}\right)X_2+R_{0_1}X_1\right\}=0$$

The Equations 3 and 4 are identical with the flutter Equations 1 and 2 if the electric circuit elements are adjusted so that:

$$(5) \quad L_{11}=\frac{A_1 k_1 a_{11}}{\omega_0}$$

$$(6) \quad R_{11}=\frac{2A_1 k_1}{\mu}$$

$$(7) \quad C_{11}=\frac{1}{A_1 k_1 \omega_0 \lambda^2}$$

$$(8) \quad L_{22}=\frac{A_2 k_2 a_{22}}{\omega_0}$$

$$(9) \quad R_{22}=\frac{A_2 k_2 (\frac{1}{2}-\epsilon)}{\mu}$$

$$(10) \quad C_{22}=\frac{1}{A_2 k_2 \omega_0 \eta^2 \lambda^2}$$

$$(11) \quad L_{12}=-\frac{A_1 k_2 a_{12}}{\omega_0}$$

$$(12) \quad R_{12}=-\frac{A_1 k_2}{\mu}(2-2\epsilon)$$

$$(13) \quad C_{12}=-\frac{\mu}{2A_1 k_2 \omega_0}$$

$$(14) \quad \frac{M}{C_{0_2}}=-\frac{4A_1 k_2 \omega_0}{\mu}$$

$$(15) \quad MR_{0_2}=-\frac{4A_1 k_2(\frac{1}{2}-\epsilon)}{\mu}$$

$$(16) \quad MR_{0_1}=\frac{4A_1 k_1}{\mu}$$

$$(17) \quad \frac{M}{N}=\frac{A_1}{A_2 \epsilon}$$

$$(18) \quad L_{21}=-\frac{A_2 k_1 a_{12}}{\omega_0}$$

Referring now to Fig. 3, an embodiment of this invention is illustrated which is of the form of the block diagram of Fig. 2 and hence will serve to predict flexure-torsion flutter phenomenon.

Two electric circuits are illustrated, the first comprising in series a grid bias battery 101, a fixed resistor 102, a potentiometer 103 having an adjustable tap 104, a fixed inductance 105, a variable resistor 106, a variable condenser 107, and the series combination of an anode load resistor 108 and an anode supply battery 109 in parallel with the anode 110-cathode 111 circuit of a vacuum amplifier tube 112 containing also a cathode heater 113 and a control grid 114, and with the anode 115-cathode 116 circuit of a vacuum amplifier tube 117 containing also a cathode heater 118 and a control grid 119. The second electric circuit comprises in series combination a grid bias battery 120, a fixed resistor 121, a potentiometer 122 having an adjustable tap 123, a variable resistor 124, a fixed inductance 125, a variable condenser 126, and the series combination of an anode load resistor 127 and an anode supply battery 128 in parallel with the anode 129-cathode 130 circuit of a vacuum amplifier tube 131 containing also a cathode heater 132 and a control grid 133. The positive terminal of the battery 101, the negative terminal of the battery 109, the cathode 111, and the cathode 116 in the first electric circuit and the positive terminal of the battery 120, the negative terminal of the battery 128, the cathode 130, are connected to the ground.

The first electric circuit is effectively inductively coupled to the second electric circuit by the amplifying transfer impedance network comprising the resistors 102 and 103 and the network enclosed by the dashed line 140, containing a vacuum amplifying tube 141 comprising a cathode 142 connected to ground, a cathode heater 143, a control grid 144 connected between the resistor 103 and the inductance 105, and an anode 145 connected to the series combination of an anode load resistor 146 and an anode supply battery 147 whose negative terminal is grounded, and to a coupling condenser 148 which is connected in turn to a grid bias resistor 149 and to the control grid 150 of a vacuum amplifier tube 151. The resistor 149 is connected to the negative terminal of a grid bias battery 152 whose positive terminal is grounded. The tube 151 comprises also a grounded cathode 153, a cathode heater 154, and an anode 155 which is connected to the positive terminal of the battery 147 through an anode load resistor 156 and to the small fixed condenser 157 connected to one end of a potentiometer 158 and to a resistor 159 connected to a resistor 160 connected to the negative terminal of the battery 152. A vacuum amplifier tube 161 comprises a grounded cathode 162, a cathode heater 163, a control grid 164 connected between the resistors 159 and 160, and an anode 165 connected to the positive terminal of the battery 147 through an anode load resistor 166 and to a coupling condenser 167 which is connected through a resistor 168 to a resistor 169 connected to the negative terminal of the battery 152. The other end of the potentiometer 158 is connected between resistors 168 and 169, and the adjustable tap 170 of the potentiometer 158 is connected to the control grid 171 of a vacuum amplifying tube 172 which comprises also a grounded cathode 173, a cathode heater 174, and an anode 175 which is connected to the anode 129 of the tube 131.

The adjustable tap 123 is connected to the control grid 176 of a vacuum amplifier tube 177, whose anode 178 is connected through a load resistor 179 to an anode supply battery 180. The potential drop across the load resistor 179 is coupled through a large condenser 181 to a large resistor 182, which is in series with the resistor 183, the condenser 184, the resistor 185, the grid bias battery 186, and ground. One side of a large resistor 187 is connected between the resistors 182 and 183, the other side to the bias battery 186 through a large variable resistor 188, and to the control grid 114 and one side of a large resistor 189, so that a fraction of the potential drop across the resistors 183 and 185 and the condenser 184 is added to another potential, to be described later, and impressed on the control grid 114.

The control grid 190 of a vacuum amplifier tube 191 is connected to a point between the elements 183 and 184 through a large resistor 192, and to the adjustable potentiometer tap 104 through a large resistor 193. The anode 194 of the tube 191 is connected through a load resistor 195 to an anode supply battery 196, and is coupled through a condenser 197 to a grid potentiometer 198 whose lower end is connected to a bias battery 199 and whose adjustable tap 200 is connected to the control grid 201 of a high anode resistance vacuum 202, preferably of the pentode type, with a grounded cathode 203 and suppressor 204, and a screen grid 205, connected to a screen supply battery 206. The anode 207 is connected to the supply battery 208 through an impedance network shown enclosed by the broken line 209, and comprising a resistor 210 in series with the two parallel combinations of a resistor 211 and condenser 212, and of a resistor 213 and condenser 214. The potential at the anode 207, which is substantially proportional to the product of the potential of the control grid 201 and the impedance 209 is coupled through a condenser 215 to a high resistance potentiometer 216 connected to the bias battery 120. The potentiometer tap 217 is connected to the control grid 133.

A portion of the potential drop across the elements 211, 212, 213, and 214 is added by means of a coupling condenser 218 and the large resistor 189 to another potential, as described before, and impressed on the control grid 114.

The anode 178 potential is also coupled through a condenser 219 of very small capacity to a resistor 220 connected to the bias battery 199 and having a tap 221 connected to the control grid 222 of a vacuum tube 223 whose anode is connected through a load resistor 224 to a supply battery 225 and coupled through a condenser 226 to one end of a potentiometer 227 whose other end is connected to a point between the resistor 220 and the condenser 219. The adjustable tap 228 of the potentiometer 227 is connected to the control grid 119 of the vacuum tube 117.

Referring now to both Fig. 2 and Fig. 3, the transfer impedance network 15 corresponds to the network enclosed by the dashed line 140. The inductive character of this network is due to the small condenser 157 whose impedance in the operating frequency range is very large compared with the impedance of the resistors 156, 159, and 160. The current through the condenser 157 and hence the output voltage of the coupling circuit is approximately proportional to the derivative of the current $X_1$.

Similarly the network 18 corresponds to the coupling circuit made up of the elements 177 and 219 to 228, in which the inductive factor is due to the small condenser 219. The tube 117 in Fig. 3 corresponds to the tube 7 in Fig. 2. The networks 20 and 21 correspond to the coupling circuit made up of the elements 176 to 186, in which the large condenser 184 serves for the capacitive component of transfer impedance. The network 17 corresponds to the voltage divider comprising the resistors 192 and 193.

The elements 190, 191, and 194 to 207 comprise the amplifier represented by the amplifier tube 23. The elements enclosed by the dashed line 209 make up the impedances represented by 24 and 25.

The various elements of the circuit of Fig. 3 have the following values:

Resistors

| | |
|---|---|
| 102—374 ohms | 182—150,000 ohms |
| 103—400 ohms | 183—140.5 ohms |
| 106—6,000 ohms | 185—150 ohms |
| 108—3,800 ohms | 187—500,000 ohms |
| 121—1,486 ohms | 188—1,000,000 ohms |
| 122—400 ohms | 189—5,000,000 ohms |
| 124—20,000 ohms | 192—500,000 ohms |
| 127—5,060 ohms | 193—100,000 ohms |
| 146—100,000 ohms | 195—100,000 ohms |
| 149—500,000 ohms | 198—1,000,000 ohms |
| 156—60,000 ohms | 210—5,000 ohms |
| 158—500,000 ohms | 211—2,017 ohms |
| 159—20,000 ohms | 213—3,085 ohms |
| 160—4,000 ohms | 216—500,000 ohms |
| 166—60,000 ohms | 220—100,000 ohms |
| 168—1,000,000 ohms | 224—60,000 ohms |
| 169—100,000 ohms | 227—500,000 ohms |
| 179—100,000 ohms | |

Condensers

| | |
|---|---|
| 107—1 mfd. (max.) | 197—0.5 mfd. |
| 126—1 mfd. (max.) | 212—.2775 mfd. |
| 143—0.5 mfd. | 214—.9775 mfd. |
| 157—.0001 mfd. | 215—0.5 mfd. |
| 167—0.5 mfd. | 218—0.5 mfd. |
| 181—4 mfd. | 219—25 mmfd. |
| 185—1.78 mfd. | 226—0.5 mfd. |

Inductances

105—20 hy. (2600 ohms)
125—5.2 hy. (1240 ohms)

Vacuum tubes

| | |
|---|---|
| 112—6F5 | 172—6SF5 |
| 117—6SF5 | 177—6SF5 |
| 131—6F5 | 191—6SF5 |
| 141—6SF5 | 202—6SF5 |
| 151—6SF5 | 223—6SF5 |
| 161—6SF5 | |

As a result of this congruity between the diagrams of Fig. 2 and Fig. 3, Equations 3 and 4 also define the behavior of the circuits of Fig. 3. The currents in these circuits then satisfy the flutter Equations 1 and 2 if the circuit elements are adjusted in accordance with the relations 5 and 18 inclusive.

In order to solve a practical problem by means of the circuit of Fig. 3, it is first necessary to know the parameters of the wing to be investigated. These parameters are $c$, $\mu$, $\epsilon$, $\sigma_F$, $i_F{}^2$, $\omega_d$ and $\omega_h$ as defined in the first part of the specification. Knowing these values, the values of $A_{11}$, $A_{12}$, $A_{22}$ and $\eta$ may be computed from relations given in the first part of the specification. It is convenient to have $L_{11}$, $L_{22}$ and the capacity coupling $C_{12}$ fixed constant. Suitable values of $L_{11}$ and $L_{22}$ have been found to be about 20 henrys and 5.2 henrys respectively. It is also necessary to select the arbitrary constants $\omega_0$, $A_1K_1$, $A_2K_2$ and $A_1K_2$. Convenient values for these constants have been found to be:

$\omega_0 = 2000$ radians per second $$A_1K_1 = \frac{40,000}{A_{11}}$$

$$A_2K_2 = \frac{10,400}{A_{22}}$$

$$A_1K_2 = 320\mu$$

The above completes the information necessary to evaluate Equations 5, 6, 8, 9 and 11 through 18, and to determine the ratio of $C_{11}$ to $C_{22}$ from Equations 7 and 10. The circuit of Fig. 3 is then adjusted to have these values. The adjustable elements in the circuit of Fig. 3 and the terms in Equations 3 and 4 that they adjust are as follows:

| Element in Fig. 3 | Adjusts in Equations 3 and 4 |
|---|---|
| 158 | $L_{21}$ |
| 103 | $MR_{0_1}\bar{P}'$ |
| 216 | $\bar{P}$ term |
| 185 | $R_{12}$ |
| 227 | $L_{12}$ |
| 106 | $R_{11}$ |
| 124 | $R_{22}$ |
| 122 | Ratio of terms in $\left(\left(\frac{1}{C_{0_2}\bar{P}}+R_{0_2}\right)X_2+R_{0_2}X_1\right)$ (Constant) |
| 188 | $C_{12}$ (Constant) |
| 198 | $\bar{P}'$ term (Constant) |

Any suitable method of measuring these values may be employed.

The procedure to be followed in using the circuit of Fig. 3 is to first adjust the circuit elements in accordance with the wing parameters, as explained above, and then to vary $C_{11}$ and $C_{22}$, while maintaining the proper ratio of $C_{11}$ to $C_{22}$, until oscillations are noted in the electric circuit, using an oscilloscope. The value of $C_{11}$ or $C_{22}$ for which oscillations occur substituted in Equation 7 or Equation 10 allows either of these equations to be solved for the critical speed.

The transient response of an airplane wing to a gust or other perturbation at any desired speed may be observed by setting $C_{11}$ and $C_{22}$ to the values corresponding to the desired speed, introducing an electrical perturbation into either the $X_1$ or $X_2$ circuits and noting the behavior of the currents in these circuits. If the perturbation causes sustained oscillations to occur in the electric circuits, it indicates that sustained vibration or flutter of the wing would occur following a sudden disturbance at that speed. If the oscillations caused in the electric circuit are damped and die out, it indicates that the vibration of the wing would be similarly damped and no sustained flutter would occur at that speed. The perturbation may be introduced into the network in any one of a number of ways; for example, a voltage introduced into the $X_1$ circuit is equivalent to a bending force on the wing, if $X_1$ and $X_2$ are considered the velocity of translation and the velocity of rotation, respectively.

A typical gust consisting of a suddenly applied velocity of translation would be represented by a suddenly applied current in the $X_1$ circuit. This may be accomplished by means of an external battery 230 and a switch 231 connected to pass a current through the inductance 105. When the switch is opened, the current is applied to the $X_1$ circuit and maintained momentarily by the energy stored in the magnetic field of the inductance. In a similar manner a battery 232 and a switch 233 may be connected across the inductor 125 so as to enable a perturbation to be introduced in the $X_2$ circuit, thereby indicating a sudden torsional deflection of the wing.

Thus one point of novelty is the ability of the device to indicate the response of any of the degrees of freedom of the system to a given disturbance.

Another novel feature of the invention is the fact that it is capable of calculating the behavior of a mechanical system containing a fluid continuum and that it takes into account the cumulative effect of shed vorticity in the fluid. The $\bar{P}$ coefficient is a complex function of the frequency of oscillation of the wing which represents essentially the effect of the vorticity wake shed by the oscillating wing. In other words, the present apparatus solves a system which is governed by integral-differential equations rather than by differential equations as may be seen from Equations 3 and 4. This effect is included in the coefficient $\bar{P}$, which depends on the frequency through a transcendental function.

As heretofore mentioned, the apparatus shown and described in connection with Figure 3 of the drawings is intended for use in the prediction of flexure-torsion flutter phenomena. In the event that it is found desirable to construct a machine capable of dealing with more degrees of freedom than these two, it is possible to extend the invention to take care of as many degrees of freedom as may be found necessary or desirable. The basic arrangement comprises an electric circuit for each degree of freedom of the mechanical system, and transfer impedance means for coupling each circuit to each of the other circuits. These electrical couplings represent the mechanical couplings existing between the various degrees of freedom of the mechanical system. The character of the impedances in the circuits and the character of the transfer impedances are determined by the inertia, stiffness and damping present in the various parts of the mechanical system that are free to move, and by the character of the mechanical couplings existing between these parts. The circuit impedances and the transfer impedance are so selected for a given problem that the equations defining the currents in the various circuits are identical in form to the equations defining the displacements with respect to each degree of freedom in the mechanical system to be represented. The general scheme for extending the principle of the present invention to cover "$n$" degrees of freedom ("$n$" being any finite number) is shown in the block diagram of Fig. 4. As herein shown, there are as many horizontal rows and vertical columns of blocks as there are degrees of freedom. Each horizontal row consists of an inductor connected in series with a condenser so as to form a series-resonant "tank" circuit (such as $A_{11}$, $A_{22}$, $A_{33}$ and so on to $A_{nn}$) and $n-1$ transfer impedance networks (such as $A_{12}$, $A_{13}$, and so on to $A_{1n}$). In each case the first subindex of the letter A refers to the row in which the voltage drop occurs while the second subindex of the letter refers to the row whose tank circuit current causes the voltage drop. For the sake of convenience, each of the tank circuits, such as $A_{11}$, $A_{22}$, etc., have been cross-hatched so as to clearly distinguish them from the transfer impedance networks such as $A_{12}$, $A_{13}$, $A_{21}$, etc. A voltage drop is developed in each of the tank circuits either by means of a suitable impedance element inserted therein or else by means of a transformer having a primary winding connected in series with the tank circuit and a plurality of secondary windings for applying a voltage drop to the impedance networks. This voltage drop, which is proportional to the current flowing in the tank circuit, is applied to each of the impedance networks whose second subindex corresponds with the subindex of the tank circuit. These networks cause voltage drops in a common circuit carrying the row current either by means of resistors, condensers and conductors or else by means of vacuum tube amplifiers whose plates are in parallel across a common resistance. Most of the voltages are obtained by means of the vacuum tube amplifier method since the transfer impedances are not symmetrical, negative resistances must be obtained, and it is necessary to provide fine adjustments for the majority of impedances. The voltage drops thus obtained are proportional to the aerodynamic and mechanical forces and moments acting upon one degree of freedom of an aircraft structure in flight.

The aerodynamic terms are obtained by means of vacuum tube amplifiers some of whose grids are fed by a voltage developed across a special impedance in each rod such that the magnitude and phase of the voltage vary with the electrical frequency of the machine in the same way that the slope of the aerodynamic lift curve varies with the so-called "reduced flutter frequency" used in flutter calculations. Resistance-capacitance coupling with each row circuit is used to develop the voltages on the remaining grids. The grid voltages in $A_{11}$ are proportional to the current in the first row while the grid voltages in $A_{12}-A_{1n}$ are proportional to the currents flowing in the tank circuits $A_{22}-A_{nn}$, respectively.

The impedances representing the mechanical terms are as follows:

| Mechanical | Electrical |
| --- | --- |
| Inertia | Self Inductance—Transformer coupled amplifier fed back into row from which the primary current is obtained. |
| Damping | Resistance for positive damping; positive feedback amplifiers for negative damping. |
| Stiffness | Condensers. |
| Dynamic Coupling | Transformer Coupled amplifiers fed back into a different row circuit from that in which the primary forms part of the circuit. |

Suitable switches and a bridge circuit may be provided to adjust the impedances obtained from the vacuum tube circuits as well as the values of the positive resistances. This system provides an accurate means of adjusting the parameters since long-time changes in the tube characteristics do not affect the values of the impedances determined by the bridge method.

Means may be provided to observe the row currents on the screen of a cathode ray oscilloscope and also to excite each row by a simple harmonic voltage or a square wave transient. The cathode ray tube may thus be used to observe the point of instability and the response of the system to simple harmonic or transient voltages. These electrical phenomena correspond to the flutter speed and to the response of the aircraft structure to forced vibrations or transient excitations simulating air gusts.

Having thus described our invention, what we claim as new and desire to secure by Letters Patent is:

1. Electrical means for predicting the behavior of a fluid-mechanical system capable of exhibiting the phenomenon of flutter, said means comprising an electric circuit for each degree of freedom of the mechanical system, a plurality of non-symmetrical coupling impedances interconnecting said circuits, the character of the impedances of said circuits and the character of said coupling impedances being such that the equations defining the currents in said electric circuits are identical in form to the equations defining the displacements with respect to each degree of freedom in the mechanical system.

2. Apparatus as claimed in claim 1 in which means are provided for introducing an electrical perturbation into any of said circuits and in which means are also provided to indicate the presence of oscillations in said circuits.

3. Electrical means for predicting the critical air speed for an airfoil subject to flexure-torsion binary flutter, said means comprising a first and a second electric circuit each containing inductive, capacitive and resistive elements, a plurality of transfer impedances interconnecting said circuits, a complex impedance representing the complex lift factor of the airfoil, means including said complex impedance for producing a voltage in each of said circuits proportional to the current in said circuit and a voltage proportional to the current in the other circuit, the character of said complex impedance and the character of said transfer impedances being such that the equations defining the currents in said circuits are identical in form to the equations defining the flexure and torsion displacements of the airfoil.

4. Apparatus as claimed in claim 3 in which the terms containing expressions for said capacitive elements in the equations defining said currents correspond to the terms containing expressions for air speed in the equations defining said displacements, and in which means are provided for varying said capacitive elements to simulate a variation in air speed.

5. Apparatus as claimed in claim 4 in which means are provided for introducing an electrical perturbation into either of said circuits and in which means are also provided to indicate the presence of oscillations in said circuits.

6. Electrical means for predicting the critical air speed for an airfoil subject to flexure-torsion binary flutter, said means comprising a first and a second electric circuit, each of said circuits containing inductive, capacitive and resistive elements, a first inductive transfer reactance, means producing a voltage in said first circuit proportional to the product of said first inductive reactance and the current in said second circuit, a first transfer resistance, means producing a voltage in said first circuit proportional to the product of said first transfer resistance and the current in said second circuit, a capacitive transfer reactance, means producing a voltage in said first circuit proportional to the product of the current in said second circuit and said capacitive transfer reactance, a complex impedance representing approximately the complex lift factor of the airfoil, means producing a voltage in said first circuit proportional to the product of the current in said second circuit, said capacitive transfer reactance and said complex impedance minus one-half, a second transfer resistance, means producing a voltage in said first circuit proportional to the product of the current in said second circuit, said second transfer resistance and said complex impedance minus one-half, means producing a voltage in said first circuit proportional to the product of the current in said first circuit and said complex impedance minus one-half, a second inductive transfer reactance, means producing a voltage in said second circuit proportional to the product of said second inductive transfer reactance and the current in said first circuit, means producing a voltage in said second circuit proportional to the product of the current in said second circuit, said capacitive transfer reactance and said complex impedance, means producing a voltage in said second circuit proportional to the product of the current in said second circuit, said second transfer resistance and said complex impedance, and means for producing a voltage in said second circuit proportional to the product of the current in said first circuit and said complex impedance.

7. Apparatus as claimed in claim 6 in which the capacitive elements in said two circuits are variable and in which means for introducing an electric perturbation into said circuits and means for indicating the presence of oscillations in said circuits are provided.

MAURICE A. BIOT.
THOMAS H. WIANCKO.

REFERENCES CITED

The following references are of record in the file of this patent:

UNITED STATES PATENTS

| Number | Name | Date |
|---|---|---|
| 2,067,443 | Gewertz | Jan. 12, 1937 |
| 2,244,369 | Martin | June 3, 1941 |
| 2,277,285 | Woodling | Mar. 24, 1942 |
| 2,319,106 | Blackburn | May 11, 1943 |

FOREIGN PATENTS

| Number | Country | Date |
|---|---|---|
| 389,524 | Great Britain | Mar. 20, 1933 |

OTHER REFERENCES

A Graphical Solution of Flutter Instability, by W. B. Bergen and Lee Arnold. A 30 page abstract furnished by the Glenn L. Martin Co. and a copy of same is available in Div. 22, class 244/75.6.